(12) United States Patent
Fair

(10) Patent No.: US 6,276,096 B1
(45) Date of Patent: Aug. 21, 2001

(54) STRUCTURE HAVING AN INTRUSION BARRIER AND A METHOD FOR CONSTRUCTING THE SAME

(76) Inventor: Robert Wood Fair, P.O. Box 1084, Tyler, TX (US) 75710

( * ) Notice: Subject to any disclaimer, the term of this patent is extended or adjusted under 35 U.S.C. 154(b) by 0 days.

(21) Appl. No.: 09/224,419

(22) Filed: Dec. 31, 1998

(51) Int. Cl.$^7$ .................................................. E04B 1/72
(52) U.S. Cl. ............................ 52/101; 52/265; 52/293.3; 52/741.3
(58) Field of Search ................................ 52/101, 169.11, 52/169.14, 408, 293.3, 746.1, 746.11, 741.3, 265, 267, 169.6; 49/58; 43/119

(56) References Cited

U.S. PATENT DOCUMENTS

| | | |
|---|---|---|
| 494,848 | 4/1893 | Durkin . |
| 2,271,143 | * 1/1942 | Martinus ........................... 52/169.14 |
| 3,562,983 | 2/1971 | Rector . |
| 3,716,267 | 2/1973 | Lindsay . |
| 3,872,637 | 3/1975 | Murphy . |
| 4,107,888 | 8/1978 | Krueger . |
| 4,359,845 | * 11/1982 | Harrison .............................. 52/169.6 |
| 4,549,378 | 10/1985 | Ayers et al. . |
| 4,863,189 | 9/1989 | Lindsay . |
| 4,907,386 | * 3/1990 | Ekroth ................................ 52/169.14 |
| 5,303,502 | 4/1994 | Metzner et al. . |
| 5,417,017 | 5/1995 | Toutountzis . |
| 5,669,187 | 9/1997 | Bushong . |
| 5,802,779 | 9/1998 | Hulls et al. . |

FOREIGN PATENT DOCUMENTS

| | | |
|---|---|---|
| 2652602A1 | 5/1991 | (FR) . |
| 8-027914 | 1/1996 | (JP) . |

* cited by examiner

Primary Examiner—Michael Safavi
(74) Attorney, Agent, or Firm—Brian F. Russell; Bracewell & Patterson, L.L.P.

(57) ABSTRACT

A structure intended for above-ground use has a floor support structure including at least one substantially horizontal member. A floor sheet having an upper surface and an area bounded by a perimeter is supported by the floor support structure, and at least one wall extends upwardly from the floor sheet. In order to preclude rodents and other small vertebrates from the interior of the structure, the structure is provided with an intrusion barrier disposed between the substantially horizontal member and the floor sheet. The intrusion barrier underlies substantially all of the area of the floor sheet and, at the perimeter of the floor sheet, extends upwardly to at least the upper surface of the floor sheet so that rodents and other small vertebrates are precluded from entering the structure from below. The structure may also have a roof including exterior roofing material, a support system for the exterior roofing material, and a second intrusion barrier overlaying the support system. In this manner, rodent intrusion into the structure through the roof is also precluded.

54 Claims, 3 Drawing Sheets

STRUCTURE HAVING AN INTRUSION BARRIER AND A METHOD FOR CONSTRUCTING THE SAME

BACKGROUND OF THE INVENTION

1. Technical Field

The present invention relates in general to structures and their construction and in particular to structures having an intrusion barrier to preclude entry of rodents and other pests within the structure. Still more particularly, the present invention relates to structures having integral intrusion barriers and a method for incorporating integral intrusion barriers into the construction of structures.

2. Description of the Related Art

The intrusion of rodents and similar pests into dwellings and other structures is a long standing problem that often results in food spoilage, destruction of property, and unsanitary and unhealthy conditions. In the past, most solutions to the problem of rodent intrusion have focused on trapping or poisoning the rodents within a structure, which besides being less than completely effective, may entail the disagreeable jobs of locating and disposing of the rodent (or carcass) when effective. Such lethal measures may also cause a rodent to die within inaccessible spaces of the floor, walls, or ceiling of a structure.

Of greater concern is that rodents have historically (and recently) been linked to outbreaks of aggressive and often fatal infectious diseases, for which rodents may serve as hosts without suffering any ill effects. For example, in the last ten years, there have been numerous publicized outbreaks of two acute diseases for which hantaviruses have been implicated as the etiologic agent: hemorrhagic fever with renal syndrome and hantavirus pulmonary syndrome (HPS). The hantavirus strains that cause both diseases are carried by rodents and are believed to be transmitted to humans through the respiration of the excreta of infected rodents. The predominant host for hantaviruses in the southwestern United States is the deer mouse (*Peromyscus maniculatus*), which has a pernicious propensity to enter human dwellings in search of food or shelter. As noted above, hantaviruses are particularly aggressive; for example, once a human is infected with HPS, severe respiratory difficulty is probable within as little as 12 hours, and death may occur in as little as 24 to 36 hours. The incidence of mortality due to HPS is currently 40%. Against such significant threats to human health, prior methods of addressing rodent intrusion after intrusion has occurred are unacceptable.

It is evident that a preferred alternative to controlling rodents is to prevent rodent intrusion entirely. One way in which the likelihood of rodent intrusion can be reduced is to select exterior materials (e.g., masonry veneer) that are resistant to rodent intrusion. Although such precautions may avail against rodent intrusion, it is often not economically or otherwise feasible for a structure to be constructed from such materials. For example, if portability and low expense are requirements for a particular application, a structure cannot feasibly be constructed for that application utilizing masonry veneer. This is particularly true with respect to manufactured housing (e.g., mobile homes), where the use of economical materials and construction techniques are required in order to ensure that the homes are affordable and portable. Thus, due to the requirements of portability and affordable pricing, manufactured housing and other prefabricated buildings are particularly susceptible to rodent intrusion. Other structures, however, are also susceptible to rodent intrusion. For example, structures having floors of pier-and-beam construction are vulnerable to rodent intrusion from below, and structures having composite or wood shingle roofs are vulnerable to rodent intrusion from above.

Therefore, there is a need for an effective system for preventing rodent intrusion into structures that is economical and applicable to both portable and other structures.

SUMMARY OF THE INVENTION

According to the present invention, a structure intended for above-ground use has a floor support structure including at least one substantially horizontal member. A floor sheet having an upper surface and an area bounded by a perimeter is supported by the floor support structure, and at least one wall extends upwardly from the floor sheet. In order to preclude rodents and other small vertebrates from the interior of the structure, the structure is provided with an intrusion barrier disposed between the substantially horizontal member and the floor sheet. The intrusion barrier underlies substantially all of the area of the floor sheet and, at the perimeter of the floor sheet, extends upwardly to at least the upper surface of the floor sheet (or sole plate, if present) so that rodents and other small vertebrates are precluded from entering the structure from below. The structure may also have a roof including exterior roofing material, a support system for the exterior roofing material, and a second intrusion barrier overlaying the support system. In this manner, rodent intrusion into the structure through the roof is also precluded.

All objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF ILLUSTRATIVE EMBODIMENT

Figure 1:
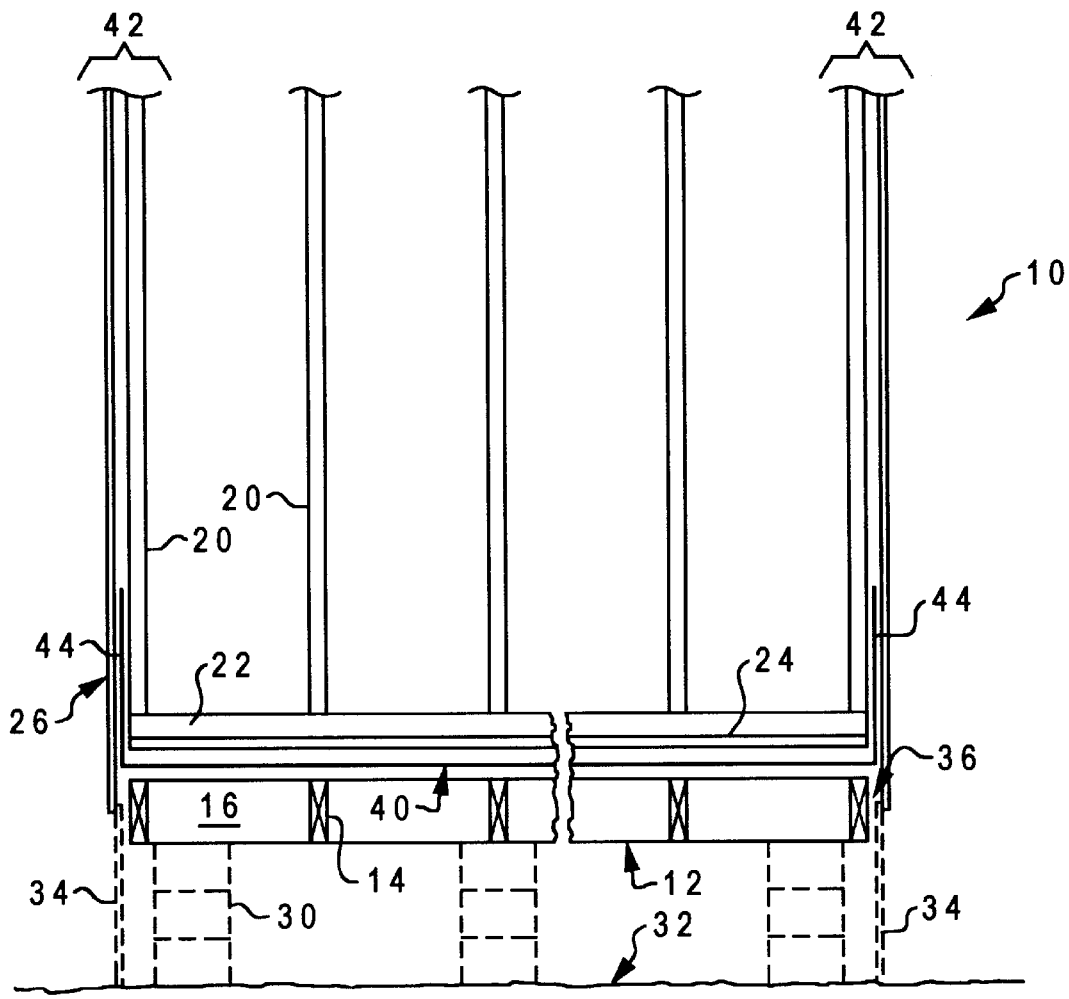
FIG. 1 is a exploded section view of an illustrative embodiment of an uninsulated structure having an intrusion barrier in accordance with the present invention.

With reference now to the figures and in particular with reference to FIG. 1, there is depicted a section view of an illustrative embodiment of an structure 10 having an uninsulated floor including an integral intrusion barrier in accordance with the present invention. Structure 10, which is an above-ground building, may be a portable storage building, a pier-and-beam home, or other type of structure. The view shown in FIG. 1 is along a longitudinal dimension of structure 10 and is slightly exploded in order to better illustrate the interrelation of its components.

As depicted, structure 10 has floor framing 12 that is typically formed by nailing or otherwise fastening together 2"×4", 2"×6", or larger wooden framing members. In the depicted embodiment, the wooden framing members comprising floor framing 12 include a number of longitudinal beams 14 aligned with the long dimension of structure 10, a rim joist 16 abutting and fasted to the aligned ends of longitudinal beams 14 at either end of the long dimension of structure 10, and, optionally, blocking members (not illustrated) intermediate the longitudinal ends of structure 10 to reinforce longitudinal beams 14 and maintain them in spaced relation. Although not illustrated in FIG. 1, floor framing 12 may be underpinned by a skid or additional longitudinal beams that can serve as a mounting point for an axle assembly or to enhance structural integrity during transportation of structure 10.

Figure 4:
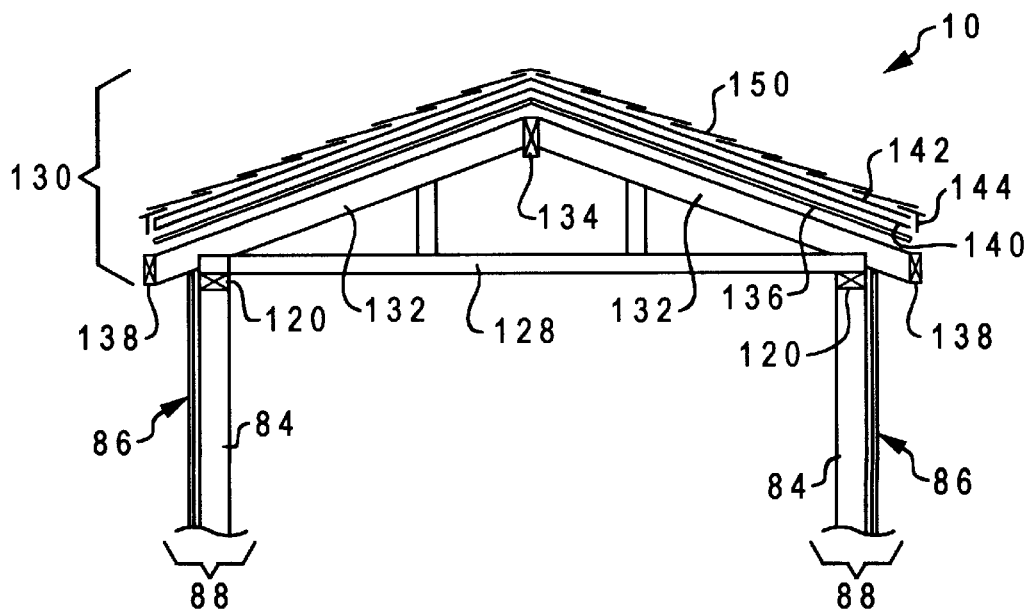
FIG. 4 is an exploded section view of an exemplary roof construction having an intrusion barrier in accordance with the present invention.

Structure 10 further includes a floor sheet 24 spanning floor framing 12 and forming the floor of structure 10. Floor sheet 24 may be formed from one or more pieces of treated plywood, chip board, or tongue-and-groove planks, for example. Fastened to floor sheet 24 is an interior frame including a sole plate 22 and a number of studs 20 that each have a lower end resting on and fastened (e.g., nailed) to sole plate 22. Studs 20 serve as a support structure for a roof (an example is illustrated in FIG. 4) as well as for interior wallboard (not illustrated) and exterior sheathing 26. As will be appreciated, a number of different materials, such as aluminum, MASONITE™, wood, and stucco, can be utilized for exterior sheathing 26.

When structure 10 is installed or constructed at a location, supports 30 (e.g., concrete masonry units (CMUs) or metal or wooden skids) are utilized to space floor framing 12 from the underlying ground 32. Spacing structure 10 from ground 32 in this way permits floor sheet 24 to be leveled and prevents floor framing 12 from rapidly deteriorating from contact with ground 32. To achieve a better appearance, optional skirting 34, which preferably has an appearance complementary to exterior sheathing 26, can be utilized to enclosed the space underneath structure 10. Skirting 34 also helps preclude the passage of animals and debris underneath structure 10, regulate temperature, and minimize drafts. While skirting 34 can be somewhat effective in preventing the penetration of large non-burrowing animals underneath structure 10, conventional skirting 26 is ineffective in precluding rodents and other small animals due to the erosion of ground 32 underneath skirting 26, shifting of ground 32, movement of skirting 34 due to wind gusts, and the burrowing activity of rodents and other small animals. For example, a mature mouse can obtain entry through a hole as small as a one-quarter of an inch (¼"). Although it is preferable to prevent entry of rodents underneath structure 10 and systems have been designed to prevent such entry (e.g., U.S. Pat. No. 5,669,187 to Bushong discloses a system to preclude passage of rodents beyond a manufactured home skirt), it is of greatest importance that rodents are precluded from entering into the interior of structure 10, for example, through the small gap 36 that typically exists between exterior sheathing 26 and floor framing 12. Although immediately after manufacture gap 36 may be small enough to prevent entry of rodents into structure 10, gap 36 is often enlarged due to the gnawing activity of rodents, making the outside corners of structure 10 vulnerable to intrusion.

Therefore, in order to preclude entry of rodents and other small vertebrates into the interior of structure 10, structure 10 further includes an intrusion barrier 40. Intrusion barrier 40 is a continuous layer that may either be a unitary piece of material or formed of multiple individual pieces of material. In the illustrative embodiment shown in FIG. 1, intrusion barrier 40 underlies all of the footprint of floor sheet 24 and extends upwardly within each exterior wall 42 at least to an elevation even with the top of floor sheet 24. In embodiments of structure 10 in which exterior walls 42 include a sole plate 22, the upwardly extending portions 44 of intrusion barrier 40 preferably extend upward at least to an elevation even with the top surface of sole plate 22. Of course, the upwardly extending portions 44 of intrusion barrier 40 may extend even higher within exterior walls 42 to any height deemed necessary to deter side intrusion, such as through the exterior sheathing 26 cladding exterior walls 42.

Although the exploded view shown in FIG. 1 does not so indicate, in use the horizontal portion of intrusion barrier 40 is maintained in intimate contact with the upper surface of each of the constituent members of floor framing 12 and the lower surface of floor sheet 24. Similarly, upwardly extending portions 44 of intrusion barrier 40 are maintained in intimate contact with the exterior surfaces of sole plate 22 and studs 20, for example, by staples, screws, nails, adhesive, adhesive caulk or other fastening means. And by virtue of the fact that exterior sheathing 26 is also fastened to studs 20 of exterior walls 42 with similar fastening means, intrusion barrier 40 is also maintained in intimate contact with the interior surface of exterior sheathing 26. In this manner, the entire vulnerable lower surface of floor sheet 24 is protected, including the edges located at gaps 36.

Intrusion barrier 40 may be formed of any material that is resistant or impervious to rodents, including those materials for which rodents are known or discovered to have an aversion and any currently known or future developed materials having sufficient durability to resist rodential gnawing. For example, rodents are known to have an aversion to naphthalene, an active ingredient of moth balls. Thus, intrusion barrier 40 may be formed of a material (e.g., canvas or oilskin) impregnated with naphthalene and/or another repellant, such as N,N-diethyl-meta toluamide, which is commonly referred to as DEET. Rodents are also believed to have an aversion to certain types of foams, such as expanding foams, and as such, intrusion barrier 40 may be implemented as a backing sheet coated with or adhered to a layer of foam, which may also include a repellant such as naphthalene or DEET. Although such embodiments are to be considered within the scope of the present invention, to ensure integrity of structure 10, intrusion barrier 40 is preferably formed of a material of sufficient durability to withstand continual rodential gnawing. Such materials include solid sheet materials (e.g., aluminum or galvanized steel) and mesh materials. If galvanized steel sheet metal is used to form intrusion barrier 40, intrusion barrier 40 is preferably approximately $\frac{1}{32}$ in. thick or thicker (or at least 22 gauge according to U.S. standard gauge). If another solid sheet material is utilized, the thickness of the material will depend upon a number of factors, including the strength and hardness characteristics of the selected material and the size of the rodents and other animals sought to be precluded from the interior of structure 10.

Figure 2:
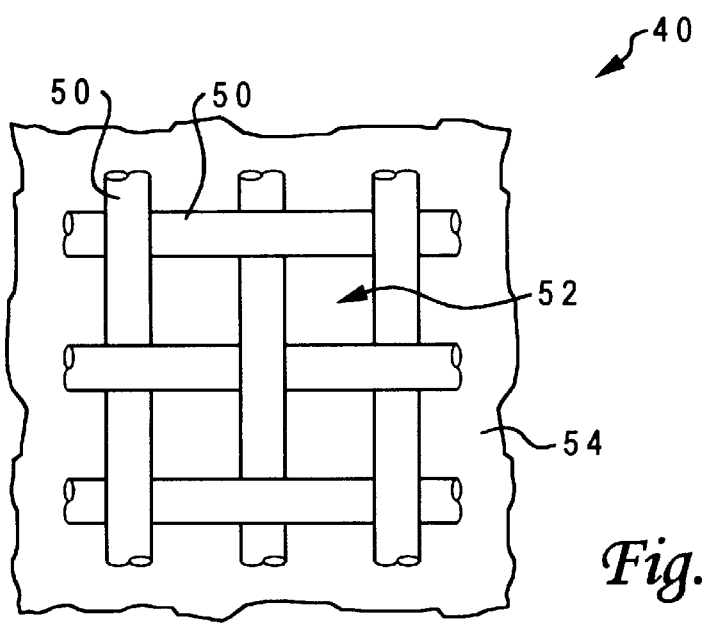
FIG. 2 is a more detailed view of a mesh embodiment of an intrusion barrier in accordance with the present invention.

FIG. 2 is a more detailed view of a preferred embodiment of an intrusion barrier 40 formed of a mesh material. In the embodiment of FIG. 2, intrusion barrier 40 includes a plurality of individual strands 50 that are woven together to form a continuous mesh sheet having pores 52. In other embodiments, strands 50 may be welded, glued, formed or otherwise joined together to form a continuous sheet of material. Strands 50 may be formed of galvanized steel (i.e., intrusion barrier 40 may be hardware cloth), aluminum, stainless steel, or a synthetic material. Synthetic materials that are candidates for use include polyvinyl chloride (PVC) and KEVLAR™. The efficacy of such synthetic materials may be enhanced by treating or impregnating the material with a repellant such as DEET. If structure 10 is intended for use in a corrosive environment such as near salt water, the material from which intrusion barrier 40 is formed is preferably selected to be one of aluminum, stainless steel, a corrosion-resistant synthetic or other corrosion-resistant material.

The permissible dimension of strands 50 and pores 52 depend upon a number of factors including the material selected for strands 50, the strength and hardness characteristics of the selected material, and the size of the rodents and other animals sought to be precluded from the interior of structure 10. In a typical embodiment in which strands 50 are formed from galvanized or stainless steel, strands 50 are approximately 1/32 inch in nominal diameter or larger (e.g., 21 gauge or larger according to the American or Brown and Sharp scales), and pores 52 are preferably between 1/16 and 3/16 inch along a largest dimension. For other mesh materials, pores 52 may be 1/64 inch, for example, if KEVLAR™ is utilized. In addition, if small rodents such as mice are not an intrusion threat, pores up to 3/8 inch or larger may be acceptable.

As also shown in FIG. 2, the mesh sheet forming intrusion barrier 40 may optionally be laminated to a plastic sheet 54 or between two such sheets. Plastic sheet(s) 54 may advantageously serve as an entry barrier to insects and as well as a vapor barrier.

Regardless of the material selected to form intrusion barrier 40, it is important that intrusion barrier 40 be substantially continuous. Thus, from the standpoints of manufacturing efficiency and barrier effectiveness, it is preferable for intrusion barrier 40 to be constructed from a unitary piece of material. If the selected material is not available in sufficient size to form the entire intrusion barrier 40, intrusion barrier 40 may be formed from multiple pieces of the selected material joined together. Because joins between pieces of material can potentially be vulnerable to rodent penetration, care must be exercised to ensure that each join is at least as resistant to rodent gnawing as the bulk of the selected material itself and that the joins do not disjoin during transportation, installation, and use of structure 10. For example, if intrusion barrier 40 is formed of sheet metal or wire mesh, joins between pieces are preferably lap joints (or multiple-lap joints) that are glued or rolled and hammered flat along the entire length of the join to form a secure and permanent connection. Although overlapping the pieces of material forming intrusion barrier 40 at joins is preferable, it is also permissible to simply abut such pieces if care is taken to prevent access to floor sheet 24 and sole plates 22, for example, by attaching the edges of each piece to a supporting surface, such as the underside of floor sheet 24.

Figure 3:
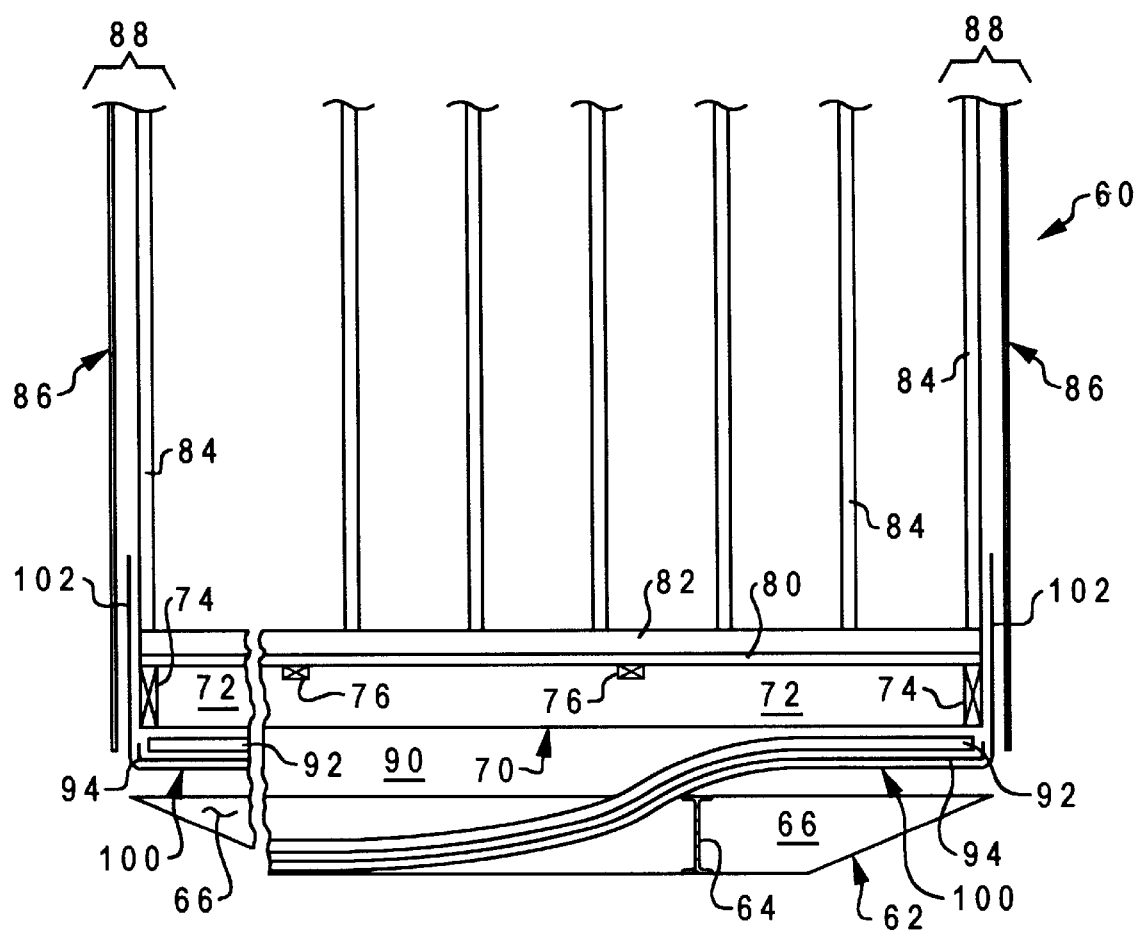
FIG. 3 is an exploded section view of an exemplary embodiment of an insulated manufactured structure having an intrusion barrier in accordance with the present invention.

With reference now to FIG. 3, there is depicted a partial section view of an exemplary embodiment of an insulated manufactured structure having an intrusion barrier in accordance with the present invention. The view shown in FIG. 3 is along a longitudinal dimension of manufactured structure 60 and is slightly exploded in order to better illustrate the various components of manufactured structure 60.

As depicted, manufactured structure 60, which may comprise a manufactured home or travel trailer, for example, is undergirded by a steel frame 62 including two longitudinal steel I-beams 64 (only one of which is illustrated) running the length of manufactured structure 64 that are both welded to a tapered steel traverse beam 66 at either end of the long dimension of manufactured structure 60. Thus, steel frame 62, when viewed in plan, generally forms a rectangle, with the tapered portions of traverse beams 66 forming cantilevers extending outward therefrom. Steel frame 62 supports the remainder of manufactured structure 60 and serves as a mounting point for an axle assembly that facilitates transportation of manufactured structure 60 or as a support point for piers (not illustrated) when manufactured structure 60 is installed at a location.

The underlying support system of manufactured structure 60 further includes floor framing 70, which is formed by nailing or otherwise fastening together 2"×4", 2"×6", or larger wooden framing members. In the depicted embodiment, the wooden framing members comprising floor framing 70 include a plurality of transverse beams 72 that are spaced at even intervals along the longitudinal dimension of manufactured structure 60, rim joists 74 abutting and fasted to the aligned ends of transverse beams 72 at either end of the transverse dimension of manufactured structure 60, and blocking members 76 spanning adjacent transverse beams 72 to reinforce transverse beams 72 and maintain them in spaced relation.

Overlying floor framing 70 is a floor sheet 80 that spans floor framing 70 and forms the floor of manufactured structure 60. Floor sheet 80 may be formed from one or more pieces of treated plywood, chip board, or tongue-and-groove planks, for example. Fastened to floor sheet 80 is an interior frame including a sole plate 82 and a number of studs 84 that each have a lower end resting on and fastened (e.g., nailed) to sole plate 80. Studs 84 serve as a support structure for a roof (e.g., like that depicted in FIG. 4) as well as for interior wallboard (not illustrated) and exterior sheathing 86. As described above, manufactured structure 60 may optionally have skirting (not illustrated) depending perimetrically from manufactured structure 60 to enclose the area underneath manufactured structure 60 and improve its aesthetic appearance.

As further illustrated in FIG. 3, there is a volume, indicated generally at reference numeral 90, enclosed on top by the bottom edge of floor framing 70, the lower edge of steel frame 62, and longitudinal I-beams 64. Volume 90 may be utilized to route water supply lines, sewer lines, HVAC ducts and other utilities (not illustrated) for manufactured structure 60. In order to protect such water supply and sewer lines from freezing due to low ambient temperature, volume 90 is enclosed by a layer of insulation 92, which may be foam, fiberglass, or any other suitable insulative material. Insulation 92 is itself protected by an integral or separate vapor barrier 94.

In order to preclude rodents and other small vertebrates from attacking or living in insulation 92 or entering into volume 90 or the interior of manufactured structure 60, manufactured structure 60 further includes an intrusion barrier 100 having a construction as discussed above with respect to FIGS. 1 and 2. In the illustrative embodiment shown in FIG. 3, intrusion barrier 100 is disposed between steel frame 62 and insulation 92, underlies all of the footprint of floor sheet 80, and extends upwardly within each exterior wall 88 at least to an elevation even with the top surface of floor sheet 80. If exterior walls 88 include sole plates 82, the upwardly extending portions 102 of intrusion barrier 100, which are continuous with the remainder of intrusion barrier 100, preferably extend upward within exterior walls 88 to an elevation even with the top surface of sole plate 82, and may extend higher if deemed necessary to protect against side intrusion. Although in the illustrative embodiment shown in FIG. 3 intrusion barrier 100 advantageously protects both vapor barrier 94 and insulation 92, in an alternative embodiment intrusion barrier 100 can be installed between vapor barrier 94 and insulation 92 (or even between insulation 92 and floor framing 70).

Although the exploded view shown in FIG. 3 does not so indicate, in operation the substantially horizontal portion of intrusion barrier 100 is tightly compressed between steel frame 62 and floor framing 70 so that intrusion barrier 100 remains in close contact with vapor barrier 94 (if vapor barrier 94 is a separate sheet) or with insulation 92 (if vapor barrier 94 is integral with either insulation 92 or intrusion barrier 100). Similarly, upwardly extending portions 102 of intrusion barrier 100 are maintained in intimate contact with the exterior surfaces of sole plate 82 and studs 84, for example, by staples, screws, nails, adhesive, adhesive caulk, or other fastening means. And by virtue of the fact that exterior sheathing 86 is also fastened to studs 84 of exterior walls 88 with similar fastening means, intrusion barrier 100 is also maintained in intimate contact with the interior surface of exterior sheathing 86.

In at least some embodiments, manufactured structure 60 is manufactured in separate sections, which are individually transported to a site and then joined together to form a single manufactured structure 60. Such structures are commonly referred to as "double-wides" or "triple-wides." In such embodiments of manufactured structure 60, each section of manufactured structure 60 is preferably manufactured with its own integral intrusion barrier 100 that underlies the entire footprint of the section and extends upwardly within each exterior wall, if any. Once the sections are assembled on site, the sections of the intrusion barrier can be joined in the manner discussed above to form a substantially continuous intrusion barrier 100. Alternatively, or in addition, each join between sections of manufactured structure 60 (or other voids) can be protected by a cylindrical tube of rodent-proof material (e.g., KEVLAR). The cylindrical tube of rodent-proof material, which has a length equal to the length of the join, is filled with a highly resilient foam or other suitable material and then secured in the join by glue, etc. and/or by tightly compressing the tube between the adjacent sections of manufactured structure 60. Thus, in the event that a gap between the sections develops at the join (e.g., due to the underlying ground settling or heaving), the tube of rodent-proof material will expand to fill the gap, effectively precluding rodents from entering manufactured structure 60.

As noted above, the construction of the structures shown in FIGS. 1 and 3 is intended to be merely illustrative of structures to which an intrusion barrier in accordance with the present invention may be applied. The definitions, dimensions, designs, materials, and constructions of structures varies widely between manufacturers and/or builders and may diverge significantly from current implementations in the future. However, an intrusion barrier in accordance with the present invention may be utilized to protect all above-ground structures from intrusion from below utilizing the general technique described herein. In a manufactured structure, an intrusion barrier in accordance with the present invention is preferably applied at a point in the manufacturing process immediately before, concurrently with, or immediately after the vapor barrier is installed. For structures constructed on site, the intrusion barrier is preferably installed immediately prior to the installation of the floor sheet. An existing structure may also be protected by installing an intrusion barrier in accordance with the present invention underneath the structure and wrapped up the exterior surfaces of the exterior walls.

An intrusion barrier in accordance with the present invention is also applicable to structures of slab-on-grade construction, which may be vulnerable to varmint intrusion through the walls if the exterior veneer is not masonry. In such a typical implementation, the intrusion barrier, which can be embodied as a solid sheet of flashing, is retained between the sole plate of each wall and the slab. The intrusion barrier then extends upwardly within each wall (i.e., between the studs and the exterior veneer) to an elevation deemed advisable to preclude entry of varmints. The intrusion barrier may alternatively be formed of a mesh material as discussed above, or a combination of solid sheet and mesh materials. If a combination of solid sheet and mesh materials is utilized, the solid sheet material (e.g., flashing) can be retained between the sole plate and the slab as discussed above, with the mesh material extending upwardly from the solid sheet material to form a continuous intrusion barrier. In this embodiment, the mesh material can be attached to the exterior surface of the studs, the solid sheet material, or the sole plate.

Referring now to FIG. 4, there is illustrated an exploded section view of an exemplary roof construction having an intrusion barrier in accordance with the present invention. Although the roof construction shown in FIG. 4 may be utilized in conjunction with structure 10 of FIG. 1, manufactured structure 60 of FIG. 3, or any other structure having a roof susceptible to damage by a rodent or other animal, the roof construction depicted in FIG. 4 will be described below with reference to structure 10 of FIG. 1 for the sake of simplicity.

As shown in FIG. 4, the studs 84 within each longitudinal exterior wall 88 of structure 10 are each fastened at an upper end to a top plate 120. Studs 84 and top plates 120 support a number of transverse ceiling joists 128 that are spaced at even or irregular intervals along the longitudinal dimension of structure 10. Wallboard or other similar material can be attached to ceiling joists 128 to form an interior ceiling for manufactured structure. Mounted on and attached to this support system is a roofing system 130.

Roofing system 130 includes a plurality of pairs of rafters (or alternatively trusses) 132, which are spaced at even or irregular intervals along the longitudinal dimension of structure 10. Each rafter 132 is fastened (e.g., by brackets or nails) at an upper end to a longitudinal ridge beam 134 and at a lower end to either or both of a ceiling joist 128 and a top plate 120. The external appearance of the lower ends of rafters 132 is enhanced by fascia boards 138. Overlaying rafters 132 is a continuous layer of decking 136, which can be formed from one or more pieces of treated plywood or chipboard, for example, which in a typical application are nailed to rafters 132. In typical construction, the material utilized for decking 136 is susceptible to rodent gnawing and intrusion. Accordingly, a substantially continuous intrusion barrier 140 of the material and construction discussed above in turn overlays the entire area of decking 136, thus precluding rodents or other varmints from entering into structure 10 through roofing system 130. Depending upon the material selected for intrusion barrier 140, intrusion barrier 140 may be stapled, nailed, or glued to decking 136, as appropriate.

Still referring to FIG. 4, 30 or 60 pound roofing felt 142 is illustrated overlaying intrusion barrier 140, although in an alternative embodiment, intrusion barrier 140 may overlay roofing felt 142. As will be appreciated by those skilled in the art, roofing felt 142 is typically applied by overlapping a number of strips of material until the entire surface of roofing system 130 is covered. Over roofing felt 142, asphalt (i.e., composition) shingles 150 are attached, for example, with roofing nails. Around the perimeter of roofing system 130, the edges of roofing felt 142 and intrusion barrier 140 are preferably clamped against decking 136 by substantially L-shaped drip moldings 144. In addition to ensuring that a rodent cannot achieve access underneath intrusion barrier 140, drip moldings 144 perform the conventional function of routing water running off of shingles 150 away from fascia boards 138 and the interface between fascia boards 138 and rafters 132. In an alternative embodiment, the edges of intrusion barrier 140 can overlap drip moldings 144.

Figure 5:
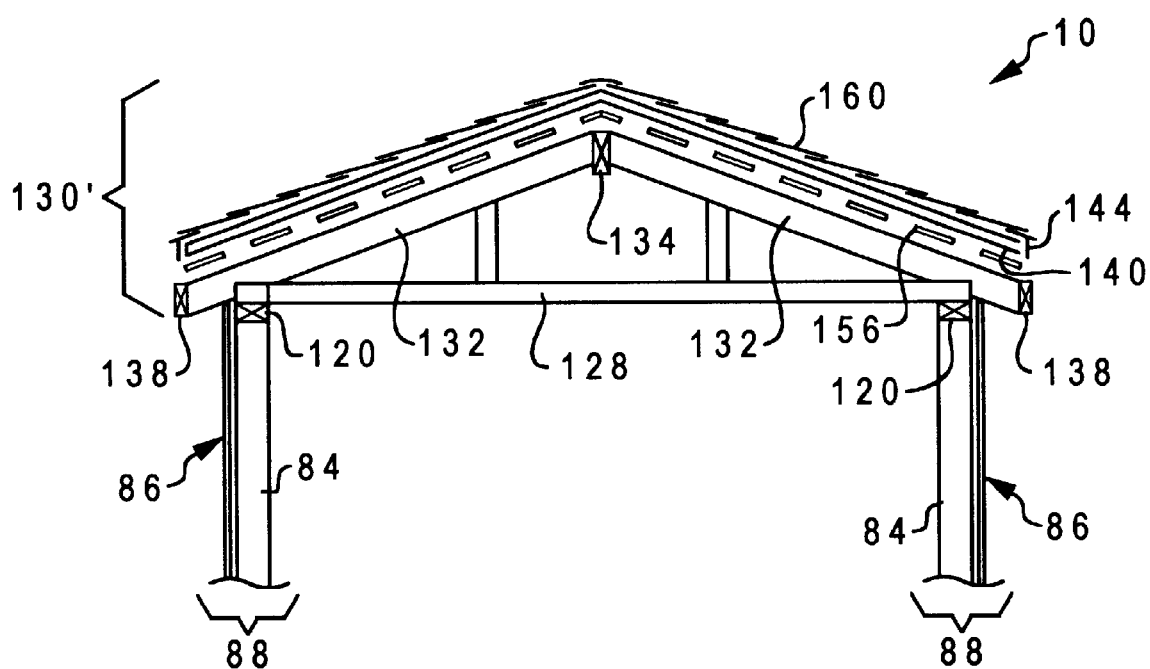
FIG. 5 is an exploded section view of an exemplary roof construction including wood shingles and an intrusion barrier in accordance with the present invention.

As shown in FIG. 5, an intrusion barrier in accordance with the present invention is also applicable to roofs of other construction, such as wood shingle roofs. In such applications, the support structure 130" of the wood shingles 160 typically includes rafters 132 and purlins 156 rather than rafters overlaid with decking, and roofing felt is omitted. However, like the application illustrated in FIG. 4, the intrusion barrier 140 for a wood shingle roof overlays the entire area of the roof and is disposed between the support structure for the wood shingles 140 and the wood shingles 140 themselves. The intrusion barrier 140 is also preferably maintained in place at each roof edge by a drip molding 144 as discussed above or by attaching the intrusion barrier 140 to the interior surface of the fascia board 138. An intrusion barrier in accordance with the present invention may also be applied over an existing roof.

Those skilled in the art will recognize that for certain structures (e.g., homes) having one or more intrusion barriers in accordance with the present invention, it may be desirable or required for plumbing pipes, vent pipes, cables, and other protrusions to pass through an intrusion barrier. Of course, if a mesh intrusion barrier is employed and all protrusions are smaller in diameter than the pore size of the mesh, the protrusions can simply pass through the intrusion barrier. For larger diameter protrusions or for non-mesh intrusion barriers, additional steps should be taken to ensure that the point at which each protrusion penetrates the intrusion barrier does not become an entry point for rodents. In particular, at the point of penetration, the protrusion barrier should be glued, clamped, welded, or otherwise affixed to the protrusion around its entire perimeter. In addition, it is recommended that any open-ended protrusions, such as plumbing vents, be protected by a rodent-proof mesh screen that is glued, clamped, welded or otherwise attached over or in the opening to preclude entry of rodents. All protrusions are preferably either metal or metal-sheathed at the point at which those protrusions pass through an intrusion barrier and for a safe distance on either side of the intrusion barrier in order to withstand rodential gnawing. For example, plumbing pipes passing through an intrusion barrier protecting the underside of a structure are preferably metal or sheated with a rodent-proof intrusion barrier for their entire above-ground length. Thus, all protrusions and openings through an intrusion barrier that are larger than ³⁄₁₆ in. preferably have either an internal or external barrier to protect against rodent intrusion. In addition, soffit vents, eave vents, gable vents, and other openings that do not require protrusions through an intrusion barrier are also preferably protected by a rodent-proof mesh screen.

As has been described, the present invention provides a structure having an integral intrusion barrier that precludes rodents and other animals from entering into the structure. When applied to protect the lower portions of an above-ground structure, the intrusion barrier, which is substantially continuous, is disposed between at least one substantially horizontal floor support member and the floor sheet such that the intrusion barrier underlies the entire footprint of the structure. In addition, the intrusion barrier extends upwardly within each exterior wall of the structure to an elevation at least even with the top surface of the floor sheet. When applied to roofs, an intrusion barrier in accordance with the present invention is preferably disposed between the shingles (or other roofing material) and the rafters and/or other support structures for the shingles.

While the invention has been particularly shown and described with reference to an illustrative embodiment, it will be understood by those skilled in the art that various changes in form and detail may be made therein without departing from the spirit and scope of the invention. For example, although FIGS. 1 and 3 depict embodiments of the present invention in which an intrusion barrier is utilized to protect the lower portions of particular types structures, it should be understood that an intrusion barrier in accordance with the present invention may also be utilized to protect any above-grade structure that is manufactured or built on site, including, without limitation, homes of pier-and-beam construction.

What is claimed is:

1. A structure, comprising:
   a floor support structure including at least one substantially horizontal member, wherein at least a portion of the floor support structure rests upon underlying ground;
   a floor sheet supported above the underlying ground by said floor support structure such that there is an air space between the floor sheet and the underlying ground, said floor sheet having an area bounded by a perimeter;
   at least one wall extending upwardly at said perimeter of said floor sheet; and
   an intrusion barrier formed of metal, wherein said intrusion barrier underlies substantially all of said area of said floor sheet such that rodents and other small vertebrates are excluded from said structure.

2. The structure of claim 1, wherein the at least one substantially horizontal member is supported above the underlying ground by the floor support structure.

3. The structure of claim 1, wherein said intrusion barrier is formed of metal.

4. The structure of claim 1, wherein said intrusion barrier is formed of mesh.

5. The structure of claim 4, said mesh having pores, wherein each pore has a maximum linear dimension of between 0.035 and 0.375 inches.

6. The structure of claim 4, said mesh being formed of a plurality of wire strands, wherein each of said plurality of wire strands has a diameter of at least approximately ¹⁄₃₂ inch.

7. The structure of claim 1, said wall including a sole plate having a top and a bottom supported by said floor, wherein said intrusion barrier extends upwardly at said perimeter to at least said top of said sole plate.

8. The structure of claim 1, said wall further including exterior sheathing and a plurality of studs, wherein a portion of said intrusion barrier extends upwardly within said wall and is disposed between said exterior sheathing and said plurality of studs.

9. The structure of claim 1, said floor support structure comprising metal framing, wherein said at least one substantially horizontal member forms a portion of said metal framing.

10. The structure of claim 9, said floor support structure further comprising floor framing disposed between said intrusion barrier and said floor sheet.

11. The structure of claim 1, and further comprising an insulative layer disposed between said intrusion barrier and said floor sheet.

12. The structure of claim 1, wherein said intrusion barrier is a first intrusion barrier, said structure further comprising a roof supported by said at least one wall, said roof including:
   exterior roofing material;
   a support system for said exterior roofing material; and
   a second intrusion barrier overlaying said support system.

13. The structure of claim 1, wherein said intrusion barrier is disposed between said substantially horizontal member and said floor sheet.

14. A structure, comprising:
   a floor support structure including at least one substantially horizontal member;
   a floor sheet supported by said floor support structure, said floor sheet having an upper surface and an area bounded by a perimeter;
   at least one wall extending upwardly from said floor sheet, said wall including a sole plate having a top and a bottom supported by said floor sheet; and
   an intrusion barrier disposed between said substantially horizontal member and said floor sheet, wherein said intrusion barrier underlies substantially all of said area of said floor sheet and at said perimeter extends upwardly at said perimeter to at least said top of said sole plate such that rodents and other small vertebrates are excluded from said structure.

15. The structure of claim 14, wherein said intrusion barrier is formed of metal.

16. The structure of claim 14, wherein said intrusion barrier is formed of mesh.

17. The structure of claim 16, said mesh having pores, wherein each pore has a maximum linear dimension of between $1/64$ and $3/8$ of an inch.

18. The structure of claim 16, said mesh being formed of a plurality of wire strands, wherein each of said plurality of wire strands has a diameter of at least approximately $1/32$ inch.

19. The structure of claim 14, said floor support structure further comprising floor framing disposed between said intrusion barrier and said floor sheet.

20. The structure of claim 14, wherein at least a portion of the floor support structure rests upon underlying ground and the floor sheet is supported above the underlying ground by said floor support structure.

21. The structure of claim 20, wherein the at least one substantially horizontal member is supported above the underlying ground by the floor support structure.

22. The structure of claim 14, wherein said intrusion barrier comprises foam.

23. The structure of claim 14, wherein said intrusion barrier comprises a material impregnated with a chemical repellent.

24. A structure, comprising:
   a floor support structure including at least one substantially horizontal member;
   a floor sheet supported by said floor support structure, said floor sheet having an upper surface and an area bounded by a perimeter;
   at least one wall extending upwardly from said floor sheet, said wall including exterior sheathing and a plurality of studs; and
   an intrusion barrier disposed between said substantially horizontal member and said floor sheet, wherein said intrusion barrier underlies substantially all of said area of said floor sheet and at said perimeter extends upwardly to at least said upper surface of said floor sheet and within said wall so that said intrusion barrier is disposed between said exterior sheathing and said plurality of studs, wherein rodents and other small vertebrates are excluded from said structure.

25. The structure of claim 24, wherein said intrusion barrier is formed of metal.

26. The structure of claim 25, wherein said intrusion barrier is formed of mesh.

27. The structure of claim 26, said mesh having pores, wherein each pore has a maximum linear dimension of between $1/64$ and $3/8$ of an inch.

28. The structure of claim 27, said mesh being formed of a plurality of wire strands, wherein each of said plurality of wire strands has a diameter of at least approximately $1/32$ inch.

29. The structure of claim 25, said floor support structure further comprising floor framing disposed between said intrusion barrier and said floor sheet.

30. The structure of claim 25, wherein at least a portion of the floor support structure rests upon underlying ground and the floor sheet is supported above the underlying ground by said floor support structure.

31. The structure of claim 30, wherein the at least one substantially horizontal member is supported above the underlying ground by the floor support structure.

32. The structure of claim 24, wherein said intrusion barrier comprises foam.

33. The structure of claim 24, wherein said intrusion barrier comprises a material impregnated with a chemical repellent.

34. A structure, comprising:
   a floor support structure including at least one substantially horizontal member, wherein said floor support structure comprises metal framing and said at least one substantially horizontal member forms a portion of said metal framing;
   a floor sheet supported by said floor support structure, said floor sheet having an upper surface and an area bounded by a perimeter;
   at least one wall extending upwardly from said floor sheet; and
   an intrusion barrier disposed between said substantially horizontal member and said floor sheet, wherein said intrusion barrier underlies substantially all of said area of said floor sheet and at said perimeter extends upwardly to at least said upper surface of said floor sheet such that rodents and other small vertebrates are excluded from said structure.

35. The structure of claim 34, wherein said intrusion barrier is formed of metal.

36. The structure of claim 34, wherein said intrusion barrier is formed of mesh.

37. The structure of claim 36, said mesh having pores, wherein each pore has a maximum linear dimension of between $1/64$ and $3/8$ of an inch.

38. The structure of claim 37, said mesh being formed of a plurality of wire strands, wherein each of said plurality of wire strands has a diameter of at least approximately $1/32$ inch.

39. The structure of claim 34, said floor support structure further comprising floor framing disposed between said intrusion barrier and said floor sheet.

40. The structure of claim 34, wherein at least a portion of the floor support structure rests upon underlying ground and the floor sheet is supported above the underlying ground by said floor support structure.

41. The structure of claim 40, wherein the at least one substantially horizontal member is supported above the underlying ground by the floor support structure.

42. The structure of claim 34, wherein said intrusion barrier comprises foam.

43. The structure of claim 34, wherein said intrusion barrier comprises a material impregnated with a chemical repellent.

44. A roof system for a structure, said roof system comprising:

exterior roofing material;
 a support system for said exterior roofing material, wherein said support system supports at least a portion of said exterior roofing material at an angle to horizontal to provide a pitched roof surface; and
 an intrusion barrier overlaying said support system.

45. The roof system of claim 44, wherein said support system includes decking.

46. The roof system of claim 44, wherein said exterior roofing material comprises composite shingles.

47. The roof system of claim 46, and further comprising roofing felt disposed between said roofing material and said support system, wherein said intrusion barrier is also disposed between said exterior roofing material and said support system.

48. The roof system of claim 44, wherein said intrusion barrier is disposed between said exterior roofing material and said support system and has an edge, said roof system further comprising a drip molding at least partially underlying said exterior roofing material and overlying said edge of said intrusion barrier.

49. A roof system for a structure, said roof system comprising:

exterior roofing material comprising wood shingles;
 a support system for said exterior roofing material; and
 an intrusion barrier overlying said support system, wherein said intrusion barrier is disposed between said exterior roofing material and said support system.

50. A method for constructing a structure, said method comprising:

providing a floor support structure including at least one substantially horizontal member;
 attaching a floor sheet to the floor support structure so that the floor support structure supports the floor sheet above underlying ground; and
 maintaining an intrusion barrier formed of metal underlying substantially all of said area of said floor sheet such that rodents and other small vertebrates are excluded from said structure.

51. The method of claim 50, wherein maintaining said intrusion barrier comprises maintaining said intrusion barrier between said substantially horizontal member and said floor sheet.

52. A method for constructing a structure, said method comprising:

providing a floor support structure including at least one substantially horizontal member;
 attaching a floor sheet to the floor support structure;
 attaching at least one wall to said floor sheet, said wall including a sole plate having a top and a bottom supported by said floor sheet; and
 maintaining an intrusion barrier between said substantially horizontal member and the floor sheet, wherein said intrusion barrier underlies substantially all of said area of said floor sheet and at a perimeter of said floor sheet extends upwardly to at least said top of said sole plate such that rodents and other small vertebrates are excluded from said structure.

53. A method for constructing a structure, said method comprising:

providing a floor support structure including at least one substantially horizontal member;
 attaching a floor sheet to the floor support structure;
 attaching at least one wall to said floor sheet, said wall including a plurality of studs and exterior sheathing; and
 maintaining an intrusion barrier between said substantially horizontal member and the floor sheet, wherein said intrusion barrier underlies substantially all of said area of said floor sheet and at a perimeter of said floor sheet extends upwardly so that it is disposed between said plurality of studs and said sheathing such that rodents and other small vertebrates are excluded from said structure.

54. A method for constructing a structure, said method comprising metal floor framing providing a floor support structure including at least one substantially horizontal member, wherein said floor support structure comprises and said at least one substantially horizontal member forms a portion of said metal framing;
 attaching a floor sheet to the floor support structure so that the floor support structure supports the floor sheet above underlying ground said floor sheet having an upper surface and an area bounded by a perimeter;
 constructing at least one wall extending upwardly from said floor sheet; and
 maintaining an intrusion barrier between said substantially horizontal member and the floor sheet, wherein said intrusion barrier underlies substantially all of said area of said floor sheet and at said perimeter extends upwardly to at least said upper surface of said floor sheet such that rodents and other small vertebrates are excluded from said structure.

* * * * *

UNITED STATES PATENT AND TRADEMARK OFFICE
CERTIFICATE OF CORRECTION

PATENT NO. : 6,276,096 B1
DATED : August 21, 2001
INVENTOR(S) : Fair

Page 1 of 1

It is certified that error appears in the above-identified patent and that said Letters Patent is hereby corrected as shown below:

<u>Column 9,</u>
Line 19, delete "130"" and replace with -- 130' --.

Signed and Sealed this

Nineteenth Day of March, 2002

Attest:

JAMES E. ROGAN
Director of the United States Patent and Trademark Office

Attesting Officer